United States Patent
Katsuren et al.

[15] 3,692,161
[45] Sept. 19, 1972

[54] SELF-LOCKING CLUTCH

[72] Inventors: Roy I. Katsuren, Penfield, N.Y.; Lloyd L. Salisbury, Kensington, Md.

[73] Assignee: The United States of America as represented by the Secretary of the Army

[22] Filed: Oct. 14, 1970

[21] Appl. No.: 80,653

[52] U.S. Cl..................192/8 R, 188/134, 192/93
[51] Int. Cl..............................F16d 67/00
[58] Field of Search........192/8, 7, 93, 144; 188/134

[56] References Cited

UNITED STATES PATENTS 3,108,669    10/1963    Ateliani..............192/8 R

*Primary Examiner*—Allan D. Herrmann
*Assistant Examiner*—Randall Heald
*Attorney*—Charles K. Wright, Jr., William G. Gapcynski and Lawrence A. Neureither

[57] ABSTRACT

A self-locking clutch for use in motorized prosthetic devices comprising a spring loaded brake cylinder rotatable by a camming pin extending from the drive means which cams the cylinder away from a friction pad by riding in an arcuate slot in the wall of the cylinder. The cylinder is forced by the spring to re-engage the friction pad when the motor is deactivated and functions as a back-block to prevent the output from driving the mechanism.

1 Claim, 2 Drawing Figures

3,692,161

PATENTED SEP 19 1972

INVENTORS
ROY I. KATSUREN &
LLOYD L. SALISBURY
BY Charles K Wright Jr
ATTORNEY

SELF-LOCKING CLUTCH

The invention described herein may be manufactured and used by or for the Government for governmental purposes without the payment to us of any royalty thereon.

BACKGROUND OF THE INVENTION

1. Field of the Invention

The invention is designed primarily for use in upper extremity prosthetic devices where movement is controlled by a motor. The invention, however, has utility wherever a self-locking drive mechanism is needed and may be used in place of power screw and worm gear drives.

2. Description of the Prior Art

Previously motorized prosthetic devices have utilized machine elements such as gear trains which lock the device and prevent the output to the machine element from becoming the driving end when the motor is deactivated. However, the inefficiency associated with these elements is a serious disadvantage to their use.

The general concept of spring-actuated brakes as illustrated in U.S. Pat. Nos. 2,051,400 and 2,754,070 is well known. U.S. Pat. No. 2,051,400 discloses a brake assembly rotatable in either direction by a camming member attached to the drive shaft which cams against rollers to release brake shoes from stationary brake drums. This type of cumbersome structure is not feasible in prosthetic devices, however.

Electric clutches, where as the motor is energized a solenoid is energized causing the brake to disengage, have been experimented with in prosthetic devices, however, the excessive energy consumption makes their use unfeasible.

SUMMARY OF THE INVENTION

The self-locking clutch is contained in a housing which is connected externally to the motor and has a coupling which receives the motor shaft. The coupling is connected in the brake cylinder by a pin which rides in an arcuate slot in the cylinder wall. A spring forces the base of the brake against a friction pad positioned between the brake and the output end of the housing.

As the coupling turns, the pin bears against the arcuate slot in the brake cylinder. This compresses the spring which causes the brake cylinder to move away from the output end of the housing thus releasing the friction pad. When the motor is deactivated the spring is released and the brake sandwiches the friction pad against the housing to prevent the load from driving the motor unless the friction is overcome.

Accordingly, it is an object of this invention to provide a self-locking clutch which prevents movement of the mechanism except when driven by a motor.

It is a further object of the invention to provide a compact but efficient self-locking clutch adaptable for use in prosthetic devices.

It is a still further object of the invention to provide a self-locking clutch for use in prosthetics that will only fail when under great stress as required for the safety of the wearer.

DESCRIPTION OF THE PREFERRED EMBODIMENT

Figure 1:
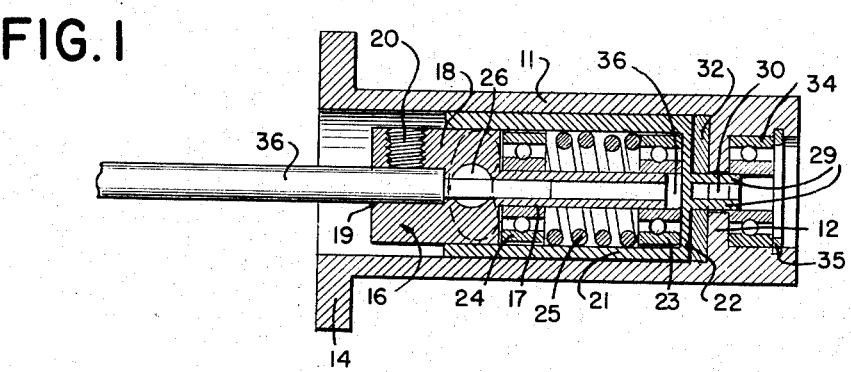
FIG. 1 is a cutaway elevational view of the self-locking clutch.

Referring to FIG. 1 the cylindrical clutch casing 11 has an internal integral disc portion 12 with an aperture 13 near one end of the casing 11 and an external flanged base 14 at the other end with screw holes 15 for mounting the casing to a motor (not shown).

Figure 2:
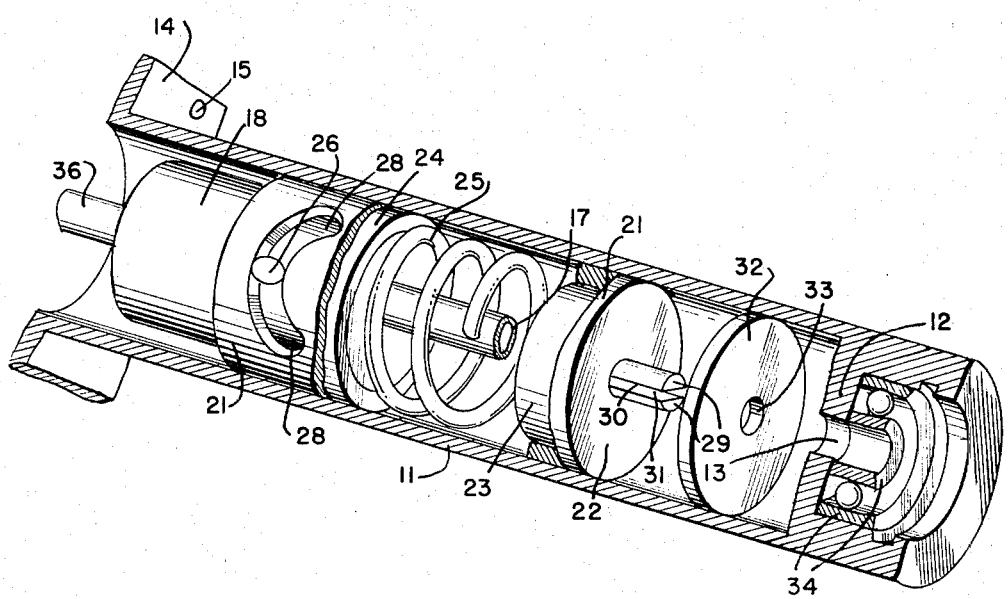
FIG. 2 is a perspective view, partly in section, of the self-locking clutch.

Referring to FIGS. 1 and 2 the cylindrical coupling 16 has a lower shaft portion 17 and an upper cylindrical portion 18 of greater diameter than the shaft 17. The upper portion 18 has a bore 19 machined to receive a motor shaft 36 which is secured by a set screw 20. A brake cylinder 21 with closed disc base 22 receives the coupling shaft 17 and part of upper portion 18 of the coupling 16. A radial bearing 23 and a radial-thrust bearing 24 which bear against the shaft 17 hold the coupling 16 concentric to the brake cylinder 21 and help to reduce drag. A compression spring 25 is positioned between the bearings 23, 24.

The coupling 16 is secured to the brake 21 by a pin 26 which is held in the coupling 16 by a roll pin (not shown). Two opposing arcuate slots 28 in the brake cylinder 21 receive the pin 26 which extends only as far as the outer diameter of the brake cylinder 21 in each of the slots 28.

Two integral protruding members 29 disposed downwardly from the closed base 22 of the brake 21 form a slot 30 which mates with a flat shaft (not shown) from the load element. The protruding members 29 are circular except for facing flat surfaces 31. A friction pad disc 32 of same diameter as the brake 21 has a central aperture 33 and slidably engages the protruding members 29.

The brake 21 with coupling 16 and friction pad 32 is slidably engaged within the casing 11, the friction pad 32 being positioned between the casing disc 12 and the brake base 22. The protruding members 29 from the brake base 22 extend into the aperture 13 of the casing disc 12. A radial bearing 34 is placed at the output end of the clutch within the casing 11 but on the opposite side of the disc 12 from the brake 21. A retaining ring 35 secures the bearing 34.

When shaft 36 is rotated, the torque created turns the coupling 16 and causes the pin 26 to bear against the arcuate slots 28 in the brake 21. This action compresses the spring 25 and moves the brake 21 to the left as the coupling 16 slides further into the brake 21, which is made possible by the cavity 37 between the coupling shaft 17 and the brake base 22 when there is no torque being applied by the load. The friction pad 32 is no longer sandwiched tightly between the casing disc 12 and the brake base 22 and shaft 36 is free to drive the load with relatively no friction.

When the motor is deactivated causing shaft 36 to stop extent the spring 25 forces the coupling 16 apart from the brake 21 to the extend permitted by the pin 26 in the arcuate slots 28. Since the coupling 16 is rigidly secured to the shaft 36, the brake is forced against the friction pad 32 which in turn is forced against the casing disc 12. Thus self-locking is accomplished and the load cannot drive the shaft 36 unless the braking friction is overcome. The clutch is placed between the motor for rotating shaft 36 and gear box (not shown) for the load since it is most effective where the torque is at a minimum.

The value of the clutch can readily be seen when, for example, it is used in an elbow assembly of a prosthetic arm. When an object is grasped by a prosthetic hand and the motor energized to raise the arm, gravity would cause the arm to fall back down when the motor is de-energized in the absence of an effective back-block. With the self-locking clutch the arm will only lower when the motor is energized in reverse or when extreme stress overcomes the braking friction. Failure under those circumstances is necessary to insure the safety of the wearer and to protect the prosthetic assembly.

We claim:

1. A self-locking clutch for use in motorized prosthetic devices comprising:
   a. a cylindrical casing having an externally flanged end for attachment to the motor and an internal disc with center bore positioned at the distal end from said flanged end;
   b. a brake cylinder slidably engageable within said casing, said brake cylinder having a closed base with protruding integral members disposed externally therefrom which pass into said casing disc center bore and engage an output shaft, said brake cylinder wall having an arcuate camming slot;
   c. a cylindrical coupling having an upper portion of greater diameter than a lower portion and having a bore in said upper portion to receive a motor drive shaft and means to secure said drive shaft so that rotational movement is imparted from said drive shaft to said coupling, said upper coupling portion further having a rigidly secured pin for engagement in said camming slot so that rotational movement is imparted to said brake cylinder;
   d. a circular friction pad positioned between the end of said brake cylinder and said casing disc, said pad having a center bore through which said protruding members pass; and
   e. spring means and radial bearings within said brake cylinder circumferentially encircling said coupling lower portion, said bearings being positioned against said brake cylinder base and said coupling upper portion with said spring positioned therebetween whereby said brake cylinder base moves off said friction pad as rotational movement compresses said spring.

* * * * *